(12) United States Patent
Zheng et al.

(10) Patent No.: US 12,335,369 B2
(45) Date of Patent: Jun. 17, 2025

(54) GENERAL-PURPOSE LIGHTWEIGHT HASH PROCESSING METHOD AND SYSTEM AND STORABLE MEDIUM

(71) Applicant: GUANGXI BOHAN TECHNOLOGY CO., LTD., Nanning (CN)

(72) Inventors: Jianliang Zheng, Shanghai (CN); Evan Zheng, Oakland Gardens, NY (US)

(73) Assignee: GUANGXI BOHAN TECHNOLOGY CO., LTD., Nanning (CN)

( * ) Notice: Subject to any disclaimer, the term of this patent is extended or adjusted under 35 U.S.C. 154(b) by 227 days.

(21) Appl. No.: 18/348,872

(22) Filed: Jul. 7, 2023

(65) Prior Publication Data

US 2024/0007269 A1    Jan. 4, 2024

Related U.S. Application Data

(63) Continuation of application No. PCT/CN2022/131905, filed on Nov. 15, 2022.

(30) Foreign Application Priority Data

Jul. 4, 2022 (CN) .......................... 20221078732.0

(51) Int. Cl.
  *H04L 29/06* (2006.01)
  *H04L 9/06* (2006.01)
(52) U.S. Cl.
  CPC ...... *H04L 9/0643* (2013.01); *H04L 2209/046* (2013.01); *H04L 2209/12* (2013.01)
(58) Field of Classification Search
  None
  See application file for complete search history.

(56) References Cited

U.S. PATENT DOCUMENTS

2007/0083491 A1\* 4/2007 Walmsley .............. G06F 21/608
2022/0066741 A1\* 3/2022 Saarinen ................. G06F 21/72

FOREIGN PATENT DOCUMENTS

CN       101753291 A      6/2010
CN       109088718 A      12/2018
(Continued)

OTHER PUBLICATIONS

International Search Report issued in corresponding PCT Application No. PCT/CN2022/131905, dated Mar. 14, 2023.
(Continued)

*Primary Examiner* — Andrew J Steinle
(74) *Attorney, Agent, or Firm* — Westbridge IP LLC

(57) ABSTRACT

Disclosed are a general-purpose lightweight hash processing method, a general-purpose lightweight hash processing system and a storable medium. The method includes: selecting a linear feedback shift register, and performing state transition on the linear feedback shift register by using a register state transition function; initializing an internal state of a hash algorithm by using an output of the linear feedback shift register in combination with an initialize algorithm; inputting data of which a hash value needs to be calculated, and updating the initialized internal state by using an update algorithm, wherein the data of which the hash value needs to be calculated is the padded data; and processing the updated internal state by using a finalize algorithm to generate a final hash value. The problems of speed and security of existing hash processing are solved.

7 Claims, 2 Drawing Sheets

(56) References Cited

FOREIGN PATENT DOCUMENTS

| | | |
|---|---|---|
| CN | 111464308 A | 7/2020 |
| JP | 2017058501 A | 3/2017 |
| KR | 102191305 B1 | 12/2020 |

OTHER PUBLICATIONS

Written Opinion issued in corresponding PCT Application No. PCT/CN2022/131905, dated Mar. 14, 2023.

* cited by examiner

GENERAL-PURPOSE LIGHTWEIGHT HASH PROCESSING METHOD AND SYSTEM AND STORABLE MEDIUM

CROSS-REFERENCE TO RELATED APPLICATIONS

This application is a continuation of International Application No. PCT/CN2022/131905, filed on Nov. 15, 2022, which claims priority to Chinese Patent Application No. 202210787320.0, filed on Jul. 4, 2022. All of the aforementioned applications are incorporated herein by reference in their entireties.

TECHNICAL FIELD

The application relates to the technical field of information technology, in particular to a general-purpose lightweight hash processing method and system and a storable medium.

BACKGROUND

A hash function compresses data from an arbitrary large domain into a fixed range. The compressed output is called the hash value, or simply the hash, of the input data. A collision occurs when multiple data are hashed into the same value. A hash function is said to be collision-resistant if it is computationally infeasible to generate the same hash value from multiple data, no matter how those data are chosen. It is worth noting that collision-resistant does not mean collision-free, because in theory collisions are inevitable for a compression function.

Most existing hash algorithms are based on the Merkle-Damgård (MD) construction (here referred to as MD construction), including the most popular MD5, SHA-1 and SHA-2 family. The MD construction uses an internal state that is of the same size of the hash value and there is a relatively simple and direct connection between the internal state and the hash value. This makes MD-based hash algorithms vulnerable to attacks. The current methods for solving the hash security include modifying the MD construction to generate more secure MD variant algorithms and developing new hash algorithms that are based on non-MD constructions, such as the wide pipe construction and the sponge function. However, the wide pipe construction generally degrades the performance. At present, algorithms based on the sponge function are considered relatively advanced and safe, and the latest SHA-3 standard is also based on the sponge function. However, some studies have pointed out that algorithms based on the sponge function may suffer from sliding attacks. In addition, although SHA-3 is more efficient than SHA-2, it is still not lightweight enough and is slower than MD5 and SHA-1.

SUMMARY

The application solves the technical problems that existing hash algorithms not only have complex structure and poor performance, but also are vulnerable to attacks and insecure.

The purpose of this section is to outline some aspects of embodiments of the application and to briefly introduce some preferred embodiments. Some simplifications or omissions may be made in this section, as well as in the abstract and title of the specification of the application, to avoid obscuring the purpose of this section, abstract and title of the specification, and such simplifications or omissions may not be used to limit the scope of the application.

In view of the existing problems in the field of information technology, the application is proposed.

Therefore, the application solves the technical problems that existing hash algorithms not only have complex structure and poor performance, but also are vulnerable to attacks and insecure.

In order to solve the above technical problems, in a first aspect, the application provides a general-purpose lightweight hash processing method, which is applied to a general-purpose lightweight hash processing system. The method includes: selecting a linear feedback shift register, and performing state transition on the linear feedback shift register by using a register state transition function; initializing an internal state of a hash algorithm by using an output of the linear feedback shift register in combination with an initialize algorithm; inputting data of which a hash value needs to be calculated, and updating the initialized internal state by using an update algorithm, the data of which the hash value needs to be calculated being the data padded from the input data of the update algorithm; and processing the updated internal state by using a finalize algorithm to generate a final hash value.

As a preferred embodiment of the general-purpose lightweight hash processing method of the application, a formula of the initialize algorithm is represented as:

Const: The toggle mask m
Input: The uninitialized internal matrix $M=[S_0; S_1; \ldots; S_n]$ and three 64-bit words s, t and x
Result: The initialized M, s, t, x
$a_0 \rightarrow m$
$b_0 \rightarrow lfsr(a_0)$
$c_0 \rightarrow lfsr(b_0)$
$d_0 \rightarrow lfsr(c_0)$
$s \rightarrow a_0+b_0+c_0+d_0$
$t \rightarrow s$
$x \rightarrow 0$
for i=1 to n do
    $a_i \rightarrow -a_{i-1}$
    for j=1 to 68 do
        $a_i \rightarrow lfsr(a_i)$
    $b_i \rightarrow lfsr(a_i)$
    $c_i \rightarrow lfsr(b_i)$
    $d_i \rightarrow lfsr(c_i)$ The i-th row $S_i=[a_i, b_i, c_i, d_i]$ of the internal matrix M is directly set to four register state values starting from the i×68-th state, while the toggle mask m is used as the first state value of the register. In addition, s, t and x are also initialized, with s and t being set to $(a_0+b_0+c_0+d_0)$ and x being set to 0.

As a preferred embodiment of the general-purpose lightweight hash processing method of the application, the update algorithm is represented as:

Input: The data to be hashed
Result: Updated internal matrix $M=[S_0; S_1; \ldots; S_n]$ and three 64-bit words s, t and x
Function update (data):
    for each 64-bit word w in data do
        $x \rightarrow x \oplus w$
        $S_0 \rightarrow S_0 \blacksquare \oplus t$
        $S_0 \rightarrow S_0 \blacksquare + x$
        $t \rightarrow t+w$
        $t \rightarrow t \oplus s$
        $t \rightarrow t+(t<<<31)$
        $t \rightarrow t+(t<<<15)$
        $t \rightarrow t+(t<<<7)$ $s \to lfsr(s)$
$x \to x+s$
$x \to x \oplus (x>>8)$
$x \to x \oplus (x>>17)$
$x \to x \oplus (x<<<31)$
for i=1 to n do
  $S_i \to S_i \blacksquare \oplus S_0$
  $S_i \to S_i \blacksquare + x$ where $\oplus$ is bitwise XOR, $<<<$ is left bitwise rotation, $>>$ is right logical bitwise shift, $<<$ is left logical bitwise shift, $\blacksquare \oplus$ is element-wise bitwise XOR (for compound data), and $\blacksquare +$ is element-wise addition (for compound data). The update algorithm uses each 64-bit word of an input data to update the internal state, the input data is padded to a length containing one or multiple complete 64-bit words, an input of an update function is one 64-bit state word in the register, one 64-bit word of the padded data and the current internal state, and an output of the update function is a new internal state returned by calling the update function each time.

As a preferred embodiment of the general-purpose lightweight hash processing method of the application, a data padding method includes suffix-free padding and prefix-free padding.

As a preferred embodiment of the general-purpose lightweight hash processing method of the application, the suffix-free padding is as follows.

The data padding includes the following steps.

Step one: enough 0 is simply appended (if the original data contains exactly one or multiple complete 64-bit words, there is no need to append 0).

Step two: a 64-bit word w is appended, and w is calculated from the data length (number of bytes contained in the data) z and the word s, namely:
  $s \to lfsr(s)$
  $w = z \oplus s$ As a preferred embodiment of the general-purpose lightweight hash processing method of the application, by applying the finalize algorithm, $S_0 = [a_0, b_0, c_0, d_0]$ is mixed with each remaining set $S_i = [a_i, b_i, c_i, d_i]$, and then the mixed result is compressed to generate a hash word $h_i$, where i=1, 2, ..., n. The finalize algorithm is represented as:

Input: The internal matrix $M = [S_0; S_1; \ldots; S_n]$
Result: The hash value $H = h_1 h_2 \ldots h_n$
for i=1 to n do
  $a \to a_0$
  $b \to b_0$
  $c \to c_0$
  $d \to d_0$
  for j=1 to 9 do
    $a \to a+(a<<<31)$
    $b \to b \oplus a$
    $b \to b+(b<<<15)$
    $c \to c \oplus b$
    $c \to c+(c<<<7)$
    $d \to d \oplus c$
    $d \to d+(d<<<3)$
    $a_i \to a_i \oplus d$
    $a_i \to a_i+(a_i>>>31)$
    $b_i \to b_i \oplus a_i$
    $b_i \to b_i+(b_i>>>15)$
    $c_i \to c_i \oplus b_i$
    $c_i \to c_i+(c_i>>>7)$
    $d_i \to d_i \oplus c_i$
    $d_i \to d_i+(d_i>>>3)$
    $a \to a \oplus d_i$
  $h_i \to a$
where $>>>$ is right bitwise rotation.

As a preferred embodiment of the general-purpose lightweight hash processing method of the application, the update algorithm and the finalize algorithm are designed in a two-layer construction, where the upper layer is the update algorithm and the lower layer is the finalize algorithm.

In a second aspect, a general-purpose lightweight hash processing system is provided.

The system includes a processor, a network module and a memory. The processor and the memory communicate through the network module, and the processor reads and runs a computer program from the memory.

A state transition module is configured to perform state transition on a register, and use a register state transition function as a transition tool, with a linear feedback shift register being selected as the register. An initialize module is configured to initialize an internal state of a hash algorithm, and use an initialize algorithm as an initialization tool according to an output of the register in the state transition module. An update module is configured to update the initialized internal state of the hash algorithm through an update algorithm by using an output of the state transition module and the initialize module in combination with padded data. A finalize module is configured to perform post-processing on the updated internal state to generate a final hash value.

In a third aspect, a computer-readable storage medium is provided. At least one instruction, at least one program, a code set or an instruction set is stored in the storage medium, and at least one instruction, one program, a code set or an instruction set is loaded and executed by a processor to implement the general-purpose lightweight hash processing method described above.

The application has the following beneficial effects that: according to the general-purpose lightweight hash processing method and system and the storable medium provided in the embodiments of the application, the problems of speed and security of hash processing are solved by using a balanced maximum length linear feedback shift register to independently calculate each hash word through a single algorithm. In addition, the general-purpose lightweight hash processing method of the application is easy to implement, the length and starting point of a hash value may be flexibly adjusted, fast parallel calculation may be realized, and only a small storage space is required. When a hash collision occurs, the hash word may be dynamically and incrementally calculated to eliminate the collision, thereby improving the security of the hash processing method.

BRIEF DESCRIPTION OF THE DRAWINGS

In order to clearly illustrate the technical solutions of the embodiments of the application, the drawings used in the description of the embodiments will be briefly described below. It is apparent that the drawings described below are only some embodiments of the application. Other drawings may further be obtained by those of ordinary skill in the art according to these drawings without creative efforts.

DETAILED DESCRIPTION OF THE EMBODIMENTS

In order to make the above purposes, technical solutions and advantages of the embodiments of the application clear and easy to understand, the specific implementation modes of the application will be described below in detail in combination with the drawings. It is apparent that the described embodiments are only a part, rather than all, of the embodiments of the application. All other embodiments obtained by those of ordinary skill in the art based on the embodiments of the application without creative efforts shall fall within the scope of protection of the application.

In the following description, although many specific details are described in order to fully understand the application, the application may also be implemented in other ways different from those described here, and those skilled in the art may make similar extensions without departing from the meaning of the application. Therefore, the application is not limited by the specific embodiments disclosed below.

Then, "one embodiment" or "embodiment" mentioned herein means that a specific feature, structure, or characteristic may be contained in at least one implementation mode of the application. "In one embodiment" used in different places in the specification does not always refer to the same embodiment, nor an independent or alternative embodiment mutually exclusive of other embodiments.

The application is described in detail in combination with the schematic diagrams. When the embodiments of the application are described in detail, the schematic diagrams are only examples, and are not intended to limit the scope of protection of the application. In addition, the three-dimensional space of length, width and depth shall be contained in actual production.

At the same time, in the description of the application, similar reference signs and letters refer to similar items in the following drawings, so that once a certain item is defined in one drawing, it does not need to be further defined and explained in the subsequent drawings. In addition, terms "first, second or third" are used for descriptive purposes only, and cannot be understood as indicating or implying relative importance.

In the application, unless otherwise specified and defined, the terms "install, link and connect" should be broadly understood, for example, it may be fixedly connected, detachably connected, or integrally connected; may be mechanically connected, electrically connected, or directly connected, may also be indirectly connected through an intermediate medium, and it may also be the internal communication of two elements. The specific meaning of the above-mentioned terminology in the application may be understood by those of ordinary skill in the art in specific circumstances.

Figure 1:
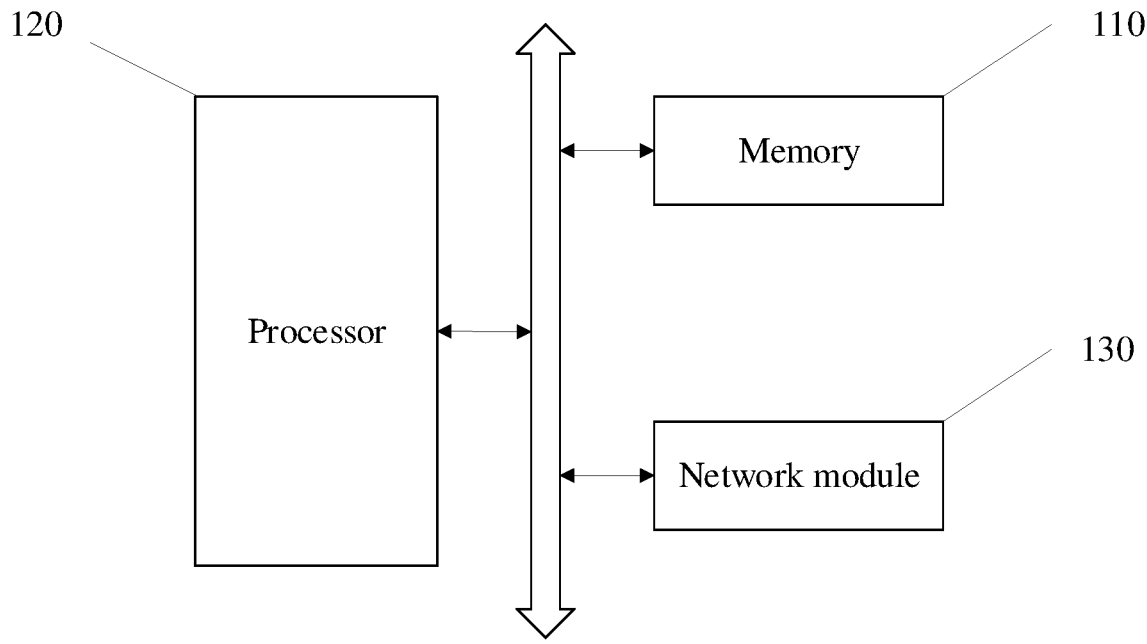
FIG. 1 is a block diagram of a general-purpose lightweight hash processing system according to an embodiment of the application.

FIG. 1 shows a block diagram of a general-purpose lightweight hash processing system according to an embodiment of the application. The general-purpose lightweight hash processing system in the embodiment of the application may be a server with functions of data storage, transmission and processing. As shown in FIG. 1, the general-purpose lightweight hash processing system 100 includes a memory 110, a processor 120 and a network module 130.

The memory 110, the processor 120, and the network module 130 are electrically connected directly or indirectly to realize data transmission or interaction. For example, these elements may be electrically connected to each other through one or more communication buses or signal lines. Data generated during processing of the processor 120 is stored in the memory 110. The processor 120 executes various functional applications and general-purpose lightweight hash processing by running software programs and modules stored in the memory 110.

The memory 110 may be, but is not limited to, a Random Access Memory (RAM), a Read Only Memory (ROM), a Programmable ROM (PROM), an Erasable PROM (EPROM), an Electric EPROM (EEPROM), etc. The memory 110 is configured to store the program and processing data of the processor 120, and the processor 120 executes the program after receiving an execution instruction.

The network module 130 is configured to establish a communication connection between the processor 120 and other communication terminal devices through a network, and in this way network signals and data are sent and received. The network signal may include a wireless signal or a wired signal.

It is understandable that the structure shown in FIG. 1 is only illustrative, and the general-purpose lightweight hash processing system 100 may also include more or fewer components, or have a different configuration, than that shown in FIG. 1. The components shown in FIG. 1 may be implemented by hardware, software, or a combination thereof.

The embodiments of the application also provide a computer-readable storage medium on which a computer program is stored, and the computer program is executed to implement the method described above.

Figure 2:
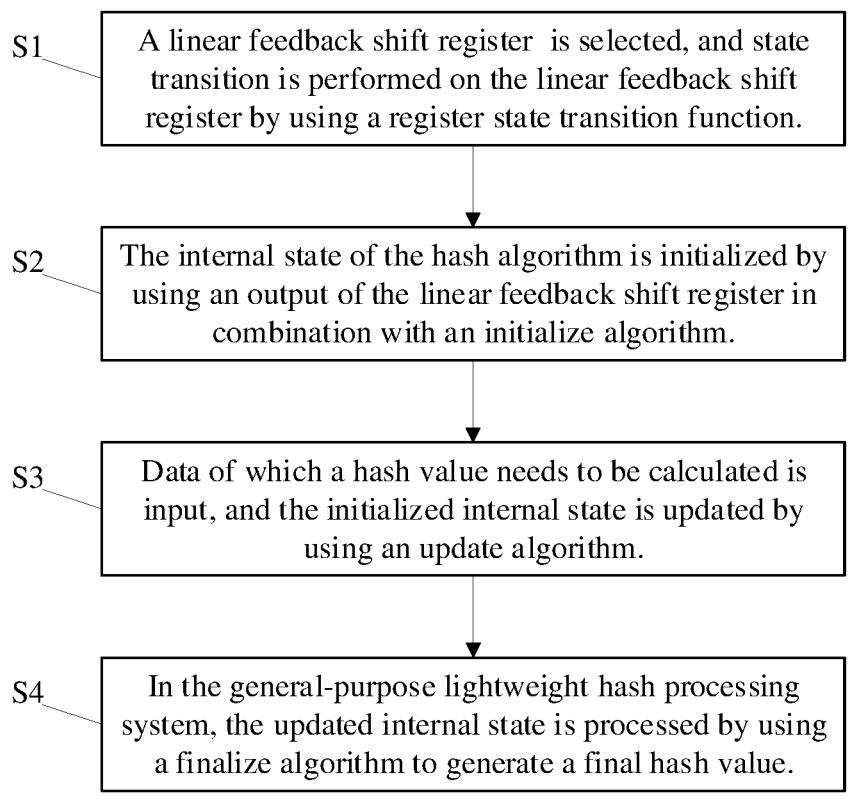
FIG. 2 is a flowchart of a general-purpose lightweight hash processing method according to an embodiment of the application.
Figure 3:
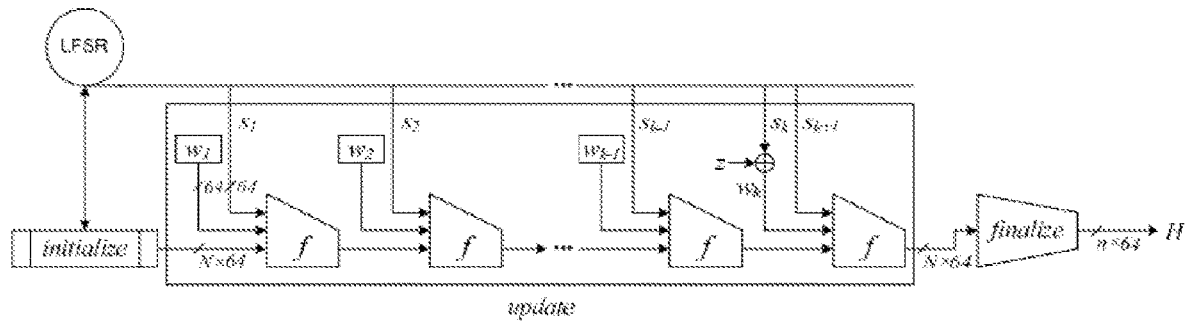
FIG. 3 is an overall schematic structural diagram of a general-purpose lightweight hash processing method according to an embodiment of the application.
Figure 4:
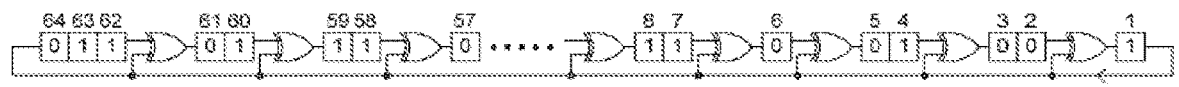
FIG. 4 is a schematic diagram of a Galois linear feedback shift register according to an embodiment of the application.

Referring to FIGS. 2 to 4, which are schematic diagrams of a general-purpose lightweight hash processing method according to an embodiment of the application. The method steps defined by the flow related to the method are applied to a general-purpose lightweight hash processing system 100, and may be implemented by a processor 120. As shown in FIGS. 2 and 3, the method includes the following S1-S4.

At $S_1$, a linear feedback shift register (LFSR) is selected, and state transition is performed on the linear feedback shift register by using a register state transition function.

Referring to FIG. 4, 64 bits of the register are numbered sequentially from high to low as 64, 63, . . . , 1, and each bit takes a binary value 0 or 1. In FIG. 4, the current state of the register is 0110 1110 . . . 1100 1001. The bit affecting the next state is called a tap, and a tap sequence in the figure is [64, 61, 59, 57, . . . , 8, 6, 5, 3], which may equivalently be represented by a characteristic polynomial $x^{64}+x^{61}+x^{59}+x^{57}+ \ldots +x^8+x^6+x^5+x^3+1$. The constant "1" in the polynomial does not represent a tap, but an input of one bit. The rightmost bit is an output bit, and the resulting sequence is called an output stream. In a mathematical operation, the tap sequence is represented by a numerical value of a toggle mask, for example, the tap sequence [64, 61, 59, 57, . . . , 8, 6, 5, 3] corresponds to a binary value 1001 0101 . . . 1011 0101 or a hexadecimal value 0x95 . . . b5 (a prefix 0x here indicates that the hexadecimal value is followed), that is, the toggle mask is 0x95 . . . b5. Through the toggle mask, the next state may be calculated from the current state of the register. For example, assuming that the current state is y and the toggle mask is m, state update may be easily calculated as follows:

i→y & 1
    y→y>>1
    if i≠0
    y→y⊕m
    where & is bitwise AND, >> is right logical bitwise shift, and ⊕ is bitwise XOR.

Optionally, in a specific implementation, a 64-bit balanced maximum length linear feedback shift register may be selected as the linear feedback shift register, and the corresponding toggle mask thereof is m=0x95ac9329ac4bc9b5, which is taken as the constant. The current register state y is input into the function to obtain a new register state y, and the function thereof is:

Const: The toggle mask m=0x95ac9329ac4bc9b5
    Input: The current register state y
    Result: The new register state y
    function lfsr (y):
        i→y & 1
        y→y>>1
        if i≠0
        y→y⊕m
        return y After calculation, the last value y is the new state. The initial state of the register cannot be zero in the calculation; otherwise the state of the register will never change and will always be zero.

The hash value may be obtained by three steps of calculation: initialize, update and finalize. The obtained hash value is a variable length hash value, and each hash value contains one or multiple 64-bit unsigned integers. For convenience, in the following description, the 64-bit unsigned integer is referred to as a 64-bit word or simply as a word. Except during the initialization stage, each word of the hash value is uncorrelated and independently calculated. Let $S_i=[a_i, b_i, c_i, d_i]$ (i=0, 1, 2, . . . , n) represent a set containing four words $a_i$, $b_i$, $c_i$ and $d_i$, then an internal state of the hash algorithm may be represented as an (n+1)×4 internal matrix M, where M:

$$M = [S_0; S_1; \cdots; S_n]$$
$$= \begin{bmatrix} a_0 & b_0 & c_0 & d_0 \\ a_1 & b_1 & c_1 & d_1 \\ \cdots & \cdots & \cdots & \cdots \\ a_n & b_n & c_n & d_n \end{bmatrix}$$

The first set S0 participates in calculating each hash word, and the other sets $S_1, S_2, \ldots, S_n$ are only used to calculate the corresponding hash words $h_i, h_2, \ldots, h_n$.

At S2, the internal state of the hash algorithm is initialized by using an output of the linear feedback shift register in combination with an initialize algorithm.

Optionally, in the embodiment, a formula of the initialize algorithm is represented as:

Const: The toggle mask m=0x95ac9329ac4bc9b5
    Input: The uninitialized internal matrix M=[$S_0$; $S_1$; . . . ; $S_n$] and three 64-bit words s, t and x
    Result: The initialized M, s, t and x
    $a_0$→m
    $b_0$→lfsr ($a_0$)
    $c_0$→lfsr ($b_0$)
    $d_0$→lfsr ($c_0$)
    s→$a_0$+$b_0$+$c_0$+$d_0$
    t→s
    x→0
    for i=1 to n do
        $a_i$<$a_{i-1}$
        for j=1 to 68 do
            $a_i$<lfsr ($a_i$)
        $b_i$→lfsr ($a_i$)
        $c_i$→lfsr ($b_i$)
        $d_i$→lfsr ($c_i$)

The i-th row $S_i=[a_i, b_i, c_i, d_i]$ of the internal matrix M is directly set to four register state values starting from the i×68-th state, while the toggle mask m is used as the first state value of the register. In addition, s, t and x are also initialized, with s and t being set to $(a_0+b_0+c_0+d_0)$ and x being set to 0.

In the initialization process, all the words $a_0, b_0, c_0, d_0, a_1, b_1, c_1, d_1, \ldots$ are ensured to be non-zero values and are different from each other, and that any two sets $S_i$ and $S_j$ (i≠j) do not overlap, that is, any word in one set is more than 64 register states away from any word in the other set, for example, the first word $a_i$ in the set $S_i$ is 65 register states away from the last word d0 in the set S0.

At S3, data of which a hash value needs to be calculated is input, and the initialized internal state is updated by using an update algorithm, the data of which the hash value needs to be calculated is the padded data.

Optionally, in the embodiment, the update algorithm is represented as:

Input: The data to be hashed
    Result: Updated internal matrix M=[$S_0$; $S_1$; . . . ; $S_n$] and three 64-bit words s, t and x
    Function update (data):
        for each 64-bit word w in data do
            x→x⊕w
            $S_0$→$S_0$■⊕t
            $S_0$→$S_0$+x
            t+w
            t⊕s
            t→t+(t<<<31)
            t→t+(t<<<15)
            t→t+(t<<<7)
            s→lfsr (s)
            x→x+s
            x→x⊕(x>>8)
            x→x⊕(x>>17)
            x→x⊕(x<<31)
            for i=1 to n do
        $S_i$→$S_i$■⊕$S_0$
        $S_i$→$S_i$+x
    where ⊕ is bitwise XOR, <<< is left bitwise rotation, >> is right logical bitwise shift, << is left logical bitwise shift, ■⊕ is element-wise bitwise XOR (for compound data), and ■+ is element-wise addition (for compound data). The two point operators "■⊕" and "■+" operate on each constituent element of two compound operands (or one compound operand and one regular operand) one by one. For example, if $S_1=[a_1, b_1, c_1, d1]$ and $S_0=[a_0, b_0, c_0, d_0]$, then $S_1$ ■⊕$S_0$=[$a_1$⊕$a_0$, $b_1$⊕$b_0$, $c_1$α$c_0$, d1⊕$d_0$]; and if x is the regular operand, then $S_1$■+x=[$a_1$+x, $b_1$+x, $c_1$+x, $d_1$+x]. In the application, compound variables are represented by capital letters and regular variables are represented by small letters.

In the update algorithm, each 64-bit word of an input data is used to update the internal state, the input data is padded to a length containing one or multiple complete 64-bit words, an input of an update function is one 64-bit state word in the register, one 64-bit word of the padded data and the current internal state, and an output of the update function is a new internal state returned by calling the update function each time.

Further, a data padding method used herein includes suffix-free padding and prefix-free padding. Taking the prefix-free padding as an example, the above-mentioned data padding process includes two steps.

Step one, enough 0 is simply appended (if the original data contains exactly one or multiple complete 64-bit words, there is no need to append 0).

Step two, a 64-bit word w is appended, and w is calculated from the data length (number of bytes contained in the data) z and the word s, namely:

s→lfsr (s)
w=z⊕s

The state transition function is called once in step two, so that an additional internal state of the linear register is consumed. As shown in FIG. 3, the last word of the padded data is set to $w_k = z \oplus S_k$, where z is the number of bytes contained in the unpadded data, which consumes an extra word from the register, in effect creating a gap between the last two register inputs of $S_{k-1}$ and $S_{k+1}$, and this gap is critical to achieving prefix-free padding.

The values of the four words $a_0$, $b_0$, $c_0$ and $d_0$ in the first set $S_0$ remain different throughout the update process, and the values of the four words $a_i$, $b_i$, $c_i$ and $d_i$ in any other set $S_i$ (i>0) are not guaranteed to be different in the update step, but any two words, such as $a_i$ and $b_i$, will not be equal for two times in a row due to the fact that assuming that $a_i$ and $b_i$ are equal at a certain time, $a_i$ and $b_i$ will perform XOR operations with the two words $a_0$ and $b_0$ respectively in the next update, and operation results obtained by $a_i$ and $b_i$ after the XOR operations must be different.

In the data input of the update algorithm, the internal state word s may be regarded as a special counter, which does not increase by 1 every time as a normal counter, but only guarantees to take different values each time. This word, actually acting as the second (automatically generated) input in addition to the normal data input, has a function of uniquely identifying each normal data word, which enhances the security of the hash algorithm and is the key to implementing the prefix-free padding of the algorithm.

At S4, in the general-purpose lightweight hash processing system, the updated internal state is processed by using a finalize algorithm to generate a final hash value.

By applying the finalize algorithm in the embodiment, $S_0 = [a_0, b_0, c_0, d_0]$ is mixed with each remaining set $S_i = [a_i, b_i, c_i, d_i]$, and then the mixed result is compressed to generate a hash word $h_i$, where i=1, 2, . . . , n. The finalize algorithm is represented as:

Input: The internal matrix $M = [S_0; S_1; \ldots; S_n]$
Result: The hash value $H = h_1 h_2 \ldots h_n$
for i=1 to n do
  a→$a_0$
  b→$b_0$
  c→$c_0$
  d→$d_0$
  for j=1 to 9 do
    a→a+(a<<<31)
    b→b⊕a
    b→b+(b<<<15)
    c→c⊕b
    c→c+(c<<<7)
    d→d⊕c
    d→d+(d<<<3)
    $a_i$→$a_i$⊕d
    $a_i$→$a_i$+($a_i$>>>31)
    $b_i$→$b_i$⊕$a_i$
    $b_i$→$b_i$+($b_i$>>>15)
    $c_i$→$c_i$⊕$b_i$
    $c_i$→$c_i$+($c_i$>>>7)
    $d_i$→$d_i$⊕$c_i$
    $d_i$→$d_i$+($d_i$>>>3)
    a→a⊕$d_i$
  $h_i$→a where >>> is right bitwise rotation.

The final hash value H is a concatenation of each hash word $h_i$, namely, $H = h_1 h_2 \ldots h_i$.

Further, the update algorithm and the finalize algorithm are designed in a two-layer construction, where the upper layer is the update algorithm and the lower layer is the finalize algorithm. In the upper layer, the update algorithm is used to absorb the data and update the internal state in the process. In this layer, a simple and efficient algorithm that may operate in parallel is used to achieve high speed operation. In the lower layer, the finalize algorithm is used to fully mix the internal state after absorbing the data, which is then compressed with a high compression ratio to generate the final hash value, so as to enhance the collision resistance and one-wayness of the function. Different compression functions are used in the upper layer and the lower layer, which may not only prevent sliding attacks, but also optimize each layer separately according to different requirements.

In the embodiment, the initialized word s is loaded in the linear feedback shift register, then the word s is continuously updated, and the update algorithm needs to be repeatedly called during update. The word s is updated only by the state transition function, is unaffected by any input data and is not regarded as part of the internal state. The words t and x are affected by the input data and the word s and they are part of the internal state.

The two-layer design achieves a good balance between the speed and security.

Let $B_{ij}$ represent the j-th byte of the i-th hash word $h_i$, then $H = h_1 h_2 \ldots h_n = b_{11} b_{12} \ldots b_{18} B_{21} B_{22} \ldots B_{28} \ldots B_{n1} B_{n2} \ldots B_{n8}$. The hash value calculated in the application may start from any byte or end at any byte. For example, starting from the 12th byte and ending at the 6th to last byte, thereby obtaining a new hash value $H = B_{24} B_{25} B_{26} B_{27} B_{28} \ldots B_{n1} B_{n2} B_{n3}$. When the hash value is represented by a hexadecimal string, the number of bytes discarded at the beginning (such as 11, or hexadecimal b) is displayed together as the prefix of the hash value.

In the embodiments of the application, a long-period non-repeating pseudo-random binary sequence is generated by using the maximum length linear feedback shift register, and the long-period non-repeating pseudo-random binary sequence may achieve the functions of initializing the constant, automatically generating the additional input in addition to the data, identifying a data block and generating a gap to achieve prefix-free padding.

In addition, the generation of variable length hash value in the application may solve the problem of hash collision. In a typical application scenario, the application predetermines a length of the hash value, and then starts to calculate the hash value. All the hash values start from the first hash word initially, that is, no byte is discarded at the beginning of any hash value. If a collision occurs, all the hash values related to the collision are adjusted to eliminate the collision, and the adjustment may be completed by adding an additional hash word to the related hash value. There is a small problem with doing this, that is, different hash values have different lengths. In the solution provided by the embodiment, the length of the whole hash value is kept unchanged by discarding one hash word at the beginning of the hash value at the same time. In rare cases, it may be necessary to repeat the adjustment process several times to solve the collision, that is, if the collision is not solved in the first adjustment or a new collision is brought in, the adjustment will continue until all the collisions are eliminated. It is also to be noted that although adjusting the hash value by adding and deleting an integer number of hash words is simple and efficient, this is not necessary, and the adjustment may also be completed on a byte level as desired. For example, if a collision occurs, and the hash values of two different files are both $h_1h_2h_3h_4$, one hash word is additionally calculated, so that the two hash values would be $h_1h_2h_3h_4h_5$ and $h_1h_2h_3h_4h_{5'}$, and in order to keep the length of the hash values unchanged, the first $h_1$ is discarded and the two hash values become $h_2h_3h_4h_5$ and $h_2h_3h_4h_{5'}$. If the additionally calculated $h_5$ and $h_{5'}$ are different, then the two recalculated hash values are also different, and the collision between them are eliminated (however, they may also collide with other hash values—if this occurs, hash words need to be additionally calculated for all the related hash values); and if $h_5$ is the same as $h_{5'}$, the additional calculation of the hash word would be continued (while discarding the hash word at the beginning to keep the hash value length unchanged) until there is no collision.

In addition, the hash algorithm designed in the embodiments of the application is designed to take advantage of Single Instruction Multiple Data (SIMD) intrinsics. The SIMD intrinsics are supported on most Central Processing Units (CPUs) and all Graphics Processing Units (GPUs) today, which may substantially increase the computing speed.

Figure 5:
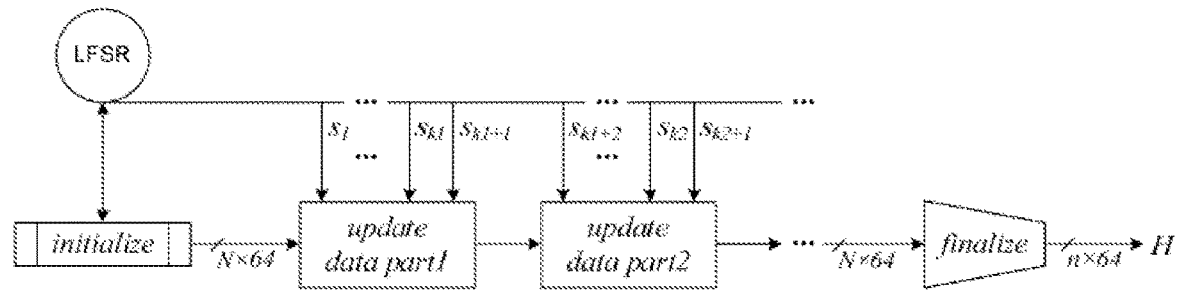
FIG. 5 is a schematic structural diagram for calculating a hash value of structured multipart data of a general-purpose lightweight hash processing method according to an embodiment of the application.

Referring to FIG. 5, the embodiments of the application also provide a schematic structural diagram for calculating a hash value of structured multipart data of a general-purpose lightweight hash processing method.

As shown in FIG. 5, with regard to the structured multipart data, each part of the data is padded first, then all the padded parts are concatenated, and finally a hash value of the concatenated data is calculated. This processing method of first padding and then concatenating is different from the traditional processing method of first concatenating and then padding, and in the traditional processing method of first concatenating and then padding, structural information of the data may not be retained due to the fact that no boundary information is reflected in the final padded data. However, the processing method of first padding and then concatenating may achieve the purpose of calculating a single hash value for the whole data. In the case of using suffix-free padding or prefix-free padding, the structured information of the data may be retained, and the processing method of first padding and then concatenating is more suitable for computing the structured multipart data, such as pairs of keys and values, a list of files in a folder, a list of transactions in a ledger, etc.

In addition, by using the structured multipart data, the hash algorithm in the embodiment may be regarded as a keyed hash function, that is, the key and the data are used as two parts of structured data to compute the hash value.

In the basic algorithm of the two above-mentioned embodiments, each set $S_i=[a_i, b_i, c_i, d_i]$ is composed of 4 64-bit words. In a more general-purpose design, the number of 64-bit words contained in each set $S_i$ may be increased as needed. By increasing the number of words, the security may be improved while the running speed may be reduced. Although the number of words may be any value no less than 4, it is suggested to use an even number or an exponent of 2 to take advantage of the SIMD intrinsics. The basic algorithm can be easily modified to use more words in each set $S_i$. The number of iterations in the second for loop of the update algorithm is set to the sum of the number of words in each set $S_i$ and the number of bits in each word, that is, 4+64=68. Therefore, this number of iterations should be modified to a general value q+64 in the general algorithm, where q is the number of words in each set $S_i$. In addition, the added words in each set $S_i$ need to be added to the code in the same way as for the original 4 words. When the number of words in each set $S_i$ is not 4, a hexadecimal expression for each hash value must start with this number plus a colon. For example, if the hash value b-40b9442506 . . . 3d627a given in the previous example is calculated with the number of words in each $S_i$ set to 6, then its complete form should be 6:b-40b9442506 . . . 3d627a.

Therefore, the hash algorithm of the application is able to dynamically adjust the security of the LHA algorithm only by adjusting the number of words contained in each set $S_i=[a_i, b_i, c_i, d_i \ldots]$ without changing the basic algorithm, and to effectively deal with various new and unknown attacks at a minimum cost by dynamically adjusting the security of the hash algorithm.

In addition, although only the 64-bit operation is described in the hash algorithm of the application, the basic algorithm may be applied almost intact to other bits, such as a 32-bit, 16-bit or 8-bit operation instead of the 64-bit operation on some small resource-constrained devices that do not support the 64-bit operation.

Figure 6:
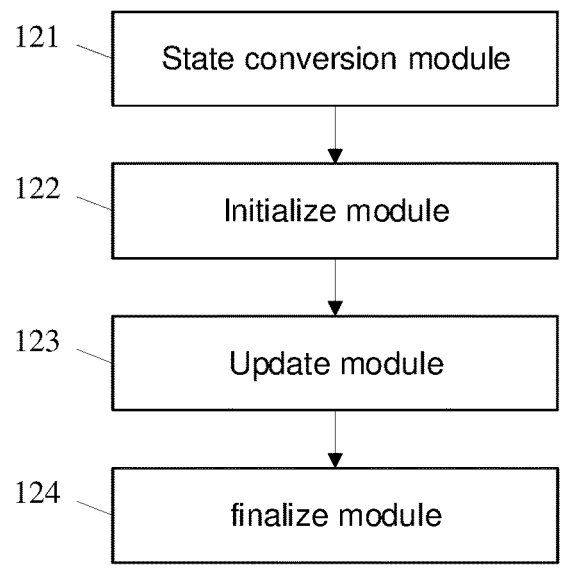
FIG. 6 is a block flowchart of a processor of a general-purpose lightweight hash processing system according to an embodiment of the application.

Referring to FIG. 6, based on the same inventive concept described above, the processor 120 includes a state transition module 121, an initialize module 122, an update module 123 and a finalize module 124.

The state transition module 121 is configured to perform state transition on a register, and to use a register state transition function as a transition tool, a linear feedback shift register being selected as the register.

The initialize module 122 is configured to initialize an internal state of a hash algorithm, and to use an initialize algorithm as an initialization tool according to an output of the register in the state transition module.

The update module 123 is configured to update the initialized internal state of the hash algorithm through an update algorithm by using an output of the state transition module and the initialize module in combination with padded data.

The finalize module 124 is configured to perform post-processing on the updated internal state to generate a final hash value. It is understandable that the description of the modules described above may be referred to in the description of the method shown in FIGS. 2 to 5, which will not be elaborated here.

In several embodiments provided by the embodiments of the application, it should be understood that the disclosed apparatuses and methods may be implemented in other ways. The apparatus embodiments and method embodiments described above are only schematic, for example, the flowcharts and block diagrams in the drawings illustrate probably implemented system architectures, functions and operations of the apparatus, method and computer program product according to multiple embodiments of the application. In this regard, each block in the flowchart or block diagram may represent a module, a program segment, or a portion of code, which contains one or more executable instructions for implementing the specified logic function. It is also to be noted that in some alternative implementation modes, the functions marked in the blocks may also occur in a different order from those marked in the drawings. For example, two blocks shown in succession may, in fact, be executed substantially in parallel, and sometimes in a reverse order, depending upon the functionality involved. It is also to be noted that each block in the block diagram and/or flowchart, and a combination of blocks in the block diagram and/or flowchart may be implemented by a special purpose hardware-based system which performs a specified function or operation, or a combination of special purpose hardware and computer instructions.

In addition, each functional module in each embodiment of the application may be integrated together to form a separate part, or each module may exist separately, or two or more modules may be integrated to form a separate part.

When being implemented in form of software function module and sold or used as an independent product, the function may also be stored in a computer-readable storage medium. Based on such an understanding, the technical solutions of the application substantially or parts making contributions to the conventional art or part of the technical solutions may be embodied in form of software product, and the computer software product is stored in a storage medium, including a plurality of instructions configured to enable a computer device (which may be a personal computer, the general-purpose lightweight hash processing system 100, a network device or the like) to execute all or part of the steps of the method in each embodiment of the application. The foregoing storage medium includes: various media capable of storing program codes such as a USB flash disk, a mobile hard disk, an ROM, an RAM, a magnetic disk or an optical disk. It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement "including a/an . . . " does not exclude existence of the same other elements in a process, method, object or device including the element.

It is to be noted that the above embodiments are only used for illustrating the technical solutions of the application, but are not intended to limit the application. Although the application is described in detail with reference to the preferred embodiments, it should be understood by those of ordinary skill in the art that those skilled in the art may still make modifications or equivalent replacements to the technical solutions without departures from the spirit and scope of the technical solutions of the application, which should be included within the scope of the claims of the application.

The invention claimed is:

1. A general-purpose lightweight hash processing method, applied to a general-purpose lightweight hash processing system and comprising:
   selecting a linear feedback shift register, and performing state transition on the linear feedback shift register by using a register state transition function;
   initializing an internal state of a hash algorithm by using an output of the linear feedback shift register in combination with an initialize algorithm;
   inputting data of which a hash value needs to be calculated, and updating the initialized internal state by using an update algorithm, where the data of which the hash value needs to be calculated is the padded data; and
   processing the updated internal state by using a finalize algorithm to generate a final hash value.

2. The general-purpose lightweight hash processing method according to claim 1, wherein a formula of the initialize algorithm is represented as:
   Const: The toggle mask m
   Input: The uninitialized internal matrix $M=[S_0; S_1; \ldots; S_n]$ and three 64-bit words s, t and x
   Result: The initialized M, s, t and x
   $a_0 \rightarrow m$
   $b_0 \rightarrow \text{lfsr}(a_0)$
   $c_0 \rightarrow \text{lfsr}(b_0)$
   $d_0 \rightarrow \text{lfsr}(c_0)$
   $s \rightarrow a_0+b_0+c_0+d_0$
   $t \rightarrow s$
   $x \rightarrow 0$
   for i=1 to n do
     $a_i \rightarrow a_{i-1}$
     for j=1 to 68 do
       $a_i \rightarrow \text{lfsr}(a_i)$
     $b_i \rightarrow \text{lfsr}(a_i)$
     $c_i \rightarrow \text{lfsr}(b_i)$
     $d_i \rightarrow \text{lfsr}(c_i)$
   the i-th row $S_i=[a_i, b_i, c_i, d_i]$ of the internal matrix M is directly set to four register state values starting from the i×68-th state, while the toggle mask m is used as the first state value of the register; in addition, s, t, and x are also initialized, with s and t being set to $(a_0+b_0+c_0+d_0)$ and x being set to 0.

3. The general-purpose lightweight hash processing method according to claim 2, wherein the update algorithm is represented as:
   Input: The data to be hashed
   Result: Updated internal matrix $M=[S_0; S_1; \ldots; S_n]$ and three 64-bit words s, t and x
   Function update (data):
     for each 64-bit word w in data do
       $x \rightarrow x \oplus w$
       $S_0 \rightarrow S_0 \blacksquare \oplus t$
       $S_0 \rightarrow S_0 \blacksquare + x$
       $t \rightarrow t+w$
       $t \rightarrow t \oplus s$
       $t \rightarrow t+(t<<<31)$
       $t \rightarrow t+(t<<<15)$
       $t \rightarrow t+(t<<<7)$
       $s \rightarrow \text{lfsr}(s)$
       $x \rightarrow x+s$
       $x \rightarrow x \oplus (x>>8)$
       $x \rightarrow x \oplus (x>>17)$
       $x \rightarrow x \oplus (x<<31)$
       for i=1 to n do
         $S_i \rightarrow S_i \blacksquare \oplus S_0$
         $S_i \rightarrow S_i \blacksquare + x$
   wherein $\oplus$ is bitwise XOR, $<<<$ is left bitwise rotation, $>>$ is right logical bitwise shift, $<<$ is left logical bitwise shift, $\blacksquare\oplus$ is element-wise bitwise XOR (for compound data), and $\blacksquare+$ is element-wise addition (for compound data); the update algorithm uses each 64-bit word of an input data to update the internal state, the input data is padded to a length containing one or multiple complete 64-bit words, an input of an update function is one 64-bit state word in the register, one 64-bit word of the padded data and the current internal state, and an output of the update function is a new internal state returned by calling the update function each time.

4. The general-purpose lightweight hash processing method according to claim 1, wherein a data padding method comprises:
suffix-free padding and prefix-free padding.

5. The general-purpose lightweight hash processing method according to claim 4, wherein the suffix-free padding is as follows:
the data padding comprises the following steps:
step one: simply appending enough 0 (if the original data contains exactly one or multiple complete 64-bit words, there is no need to append 0); and
step two: appending one 64-bit word w, wherein w is calculated from the data length (number of bytes contained in the data) z and the word s, namely:
$s \to lfsr(s)$
$w = z \oplus s$.

6. The general-purpose lightweight hash processing method according to claim 5, wherein by applying the finalize algorithm, mixes $S_0 = [a_0, b_0, c_0, d_0]$ with each remaining set $S_i = [a_i, b_i, c_i, d_i]$, and then the mixed result is compressed to generate a hash word $h_i$, where $i = 1, 2, \ldots, n$, and the finalize algorithm is represented as:
Input: The internal matrix $M = [S_0; S_1; \ldots; S_n]$
Result: The hash value $H = h_1 h_2 \ldots h_n$
for i=1 to n do
$\quad a \to a_0$
$\quad b \to b_0$
$\quad c \to c_0$
$\quad d \to d_0$
$\quad$ for j=1 to 9 do
$\quad \quad a \to a + (a <<< 31)$
$\quad \quad b \to b \oplus a$
$\quad \quad b \to b + (b <<< 15)$
$\quad \quad c \to c \oplus b$
$\quad \quad c \to c + (c <<< 7)$
$\quad \quad d \to d \oplus c$
$\quad \quad d \to d + (d <<< 3)$
$\quad \quad a_i \to a_i \oplus d$
$\quad \quad a_i \to a_i + (a_i >>> 31)$
$\quad \quad b_i \to b_i \oplus a_i$
$\quad \quad b_i \to b_i + (b_i >>> 15)$
$\quad \quad c_i \to c_i \oplus b_i$
$\quad \quad c_i \to c_i + (c_i >>> 7)$
$\quad \quad d_i \to d_i \oplus c_i$
$\quad \quad d_i \to d_i + (d_i >>> 3)$
$\quad \quad a \to a \oplus d_i$
$\quad h_i \to a$
wherein >>> is right bitwise rotation.

7. The general-purpose lightweight hash processing method according to claim 1, wherein the update algorithm and the finalize algorithm are designed in a two-layer construction, the upper layer is the update algorithm and the lower layer is the finalize algorithm.

* * * * *